US010451512B2

United States Patent
Osawa et al.

(10) Patent No.: US 10,451,512 B2
(45) Date of Patent: Oct. 22, 2019

(54) OIL PRESSURE SENSOR ATTACHMENT STRUCTURE

(71) Applicant: Nidec Tosok Corporation, Zama-shi, Kanagawa (JP)

(72) Inventors: Tomoka Osawa, Zama (JP); Hiroshi Shirai, Zama (JP); Toshiaki Nakamura, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 41 days.

(21) Appl. No.: 15/922,954

(22) Filed: Mar. 16, 2018

(65) Prior Publication Data
US 2018/0275006 A1 Sep. 27, 2018

(30) Foreign Application Priority Data
Mar. 27, 2017 (JP) .................................. 2017-060989

(51) Int. Cl.
*G01L 19/14* (2006.01)
(52) U.S. Cl.
CPC .................................. *G01L 19/142* (2013.01)
(58) Field of Classification Search
CPC ... G01L 19/143; G01L 19/144; G01L 19/142; G01L 19/003; G01L 19/147
See application file for complete search history.

(56) References Cited

U.S. PATENT DOCUMENTS

| | | | | |
|---|---|---|---|---|
| 4,843,454 A | * | 6/1989 | Kato | G01L 19/0061 73/723 |
| 5,228,334 A | * | 7/1993 | Stone | G01L 19/0609 73/114.43 |
| 5,665,920 A | * | 9/1997 | Martin | G01L 9/0075 73/715 |
| 5,939,637 A | * | 8/1999 | Pitzer | G01L 19/142 73/715 |
| 5,982,047 A | * | 11/1999 | Probst | G01L 9/06 73/700 |

(Continued)

FOREIGN PATENT DOCUMENTS

JP 63-228038 A 9/1988
JP 2001-271918 A 10/2001
(Continued)

*Primary Examiner* — Harshad R Patel
*Assistant Examiner* — Tran M. Tran
(74) *Attorney, Agent, or Firm* — Keating & Bennett, LLP (57) ABSTRACT

An oil pressure sensor attachment structure includes the oil path body; the sensor case; and a seal member. The oil path body has an accommodation hole portion which accommodates the oil pressure sensor. The accommodation hole portion has a small-diameter hole portion and a large-diameter hole portion. The sensor case has a columnar portion which is disposed along a central axis extending in the up and down direction and of which at least a portion is inserted into the small-diameter hole portion. A flange portion which protrudes from the columnar portion to an outside in a radial direction and is inserted into the large-diameter hole portion. The flange portion is disposed to face a lower side of the upper body in the up and down direction. The seal member has an annular shape, and seals a portion between an inner surface of the accommodation hole portion and the sensor case.

9 Claims, 6 Drawing Sheets

(56) References Cited

U.S. PATENT DOCUMENTS

| | | | | |
|---|---|---|---|---|
| 6,369,435 B1 * | 4/2002 | Igel | G01L 19/142 | 257/415 |
| 6,584,851 B2 * | 7/2003 | Yamagishi | G01L 19/0084 | 73/715 |
| 6,604,429 B1 * | 8/2003 | Pitzer | G01L 19/0038 | 73/715 |
| 6,619,129 B2 * | 9/2003 | Pitzer | G01L 19/003 | 73/700 |
| 6,722,204 B2 * | 4/2004 | Gegalski | B60T 8/3675 | 73/716 |
| 6,736,013 B2 * | 5/2004 | Babala | B60T 8/3675 | 73/700 |
| 6,935,182 B2 * | 8/2005 | Imai | B60T 8/3675 | 73/720 |
| 7,040,174 B2 * | 5/2006 | Mundry | G01L 9/0051 | 73/723 |
| 7,152,483 B2 * | 12/2006 | Mast | G01L 19/0084 | 73/754 |
| 7,201,045 B2 * | 4/2007 | Dinkel | B60T 8/3675 | 73/121 |
| 7,555,957 B2 * | 7/2009 | Toyoda | G01L 9/0054 | 73/715 |
| 8,485,044 B2 * | 7/2013 | Delbos | G01J 5/0037 | 73/714 |
| 8,510,018 B2 * | 8/2013 | Kato | F01L 1/3442 | 123/196 R |
| 8,643,127 B2 * | 2/2014 | Dangtran | B81B 7/0077 | 257/415 |
| 9,607,596 B2 * | 3/2017 | Sood | G10K 11/004 | |
| 9,772,242 B2 * | 9/2017 | Kobayashi | G01L 9/0041 | |
| 10,113,926 B2 * | 10/2018 | Kobayashi | G01L 9/0041 | |
| 10,145,749 B2 * | 12/2018 | Abe | G01L 9/0041 | |
| 10,260,979 B2 * | 4/2019 | Aoyama | G01L 9/0042 | |
| 10,274,388 B2 * | 4/2019 | Sekiya | G01L 9/0048 | |
| 2003/0230146 A1 | 12/2003 | Imai et al. | | |
| 2010/0186830 A1 | 7/2010 | Shigyo et al. | | |
| 2013/0056100 A1 * | 3/2013 | Imaizumi | B60T 13/662 | 73/756 |
| 2018/0251108 A1 * | 9/2018 | Yamaguchi | B60T 8/3645 | |

FOREIGN PATENT DOCUMENTS

| | | |
|---|---|---|
| JP | 2004-20216 A | 1/2004 |
| JP | 2010-174991 A | 8/2010 |

* cited by examiner

OIL PRESSURE SENSOR ATTACHMENT STRUCTURE

CROSS REFERENCE TO RELATED APPLICATIONS

This application claims the benefit of priority to Japanese Patent Application No. 2017-060989 filed on Mar. 27, 2017. The entire contents of this application are hereby incorporated herein by reference.

1. FIELD OF THE INVENTION

The present invention relates to an oil pressure sensor attachment structure.

2. DESCRIPTION OF THE RELATED ART

An oil pressure control device including an oil pressure sensor is known.

For example, in Japanese Unexamined Patent Application Publication No. 2010-174991, an oil pressure sensor is attached to a control valve provided with an oil path.

As a method of attaching the oil pressure sensor to the control valve as described above, there is a method of interposing the oil pressure sensor between the two oil path bodies of the control valve. In a case of using such a method, for example, after inserting an oil pressure sensor into a through-hole provided in the upper oil path body, the lower oil path body is fixed to a lower surface of the upper oil path body, and thus the oil pressure sensor is interposed between the lower oil path body and the upper oil path body.

Here, on the lower surface of the oil pressure sensor, a seal member for sealing between the oil pressure sensor and the lower oil path body is provided. In a case of interposing the oil pressure sensor between the two oil path bodies, there is a case where the seal member falls off from the lower surface of the oil pressure sensor until the lower oil path body is fixed to the upper oil path body. Therefore, it is necessary to upside down the upper oil path body to fix the lower oil path body. Therefore, it takes time and effort to attach the oil pressure sensor, and there is a problem that the assembling performance of the oil pressure control device is deteriorated.

The present invention is made in view of the above circumstances, and an object thereof is to provide an oil pressure sensor attachment structure that can suppress falling off of a seal member when attaching an oil pressure sensor and improve the assembling performance of the oil pressure control device.

SUMMARY OF THE INVENTION

According to an aspect of the present invention, there is provided an oil pressure sensor attachment structure in which an oil pressure sensor for measuring a pressure of an oil flowing in an oil path through which the oil flows is attached to an oil path body having the oil path therein, in which the oil path body has a lower body, and an upper body which is disposed to overlap the lower body in an up and down direction, the lower body has an oil path opening portion which is connected to the oil path on an upper surface of the lower body, the oil pressure sensor has a sensor main body, and a sensor case which covers the sensor main body, the sensor case is installed on the upper surface of the lower body and has a sensing hole on the lower surface of the sensor case, which is connected to the oil path opening portion in a state where the sensor case is installed on the upper surface of the lower body, in which the oil pressure sensor attachment structure includes the oil path body; the sensor case; and a seal member which seals a portion between the oil path body and the sensor case, in which the oil path body has an accommodation hole portion which accommodates the oil pressure sensor in a state where at least a portion of the oil pressure sensor is disposed between the upper body and the lower body in the up and down direction, and the accommodation hole portion has a small-diameter hole portion and a large-diameter hole portion which is disposed on the lower side of the small-diameter hole portion in the up and down direction and of which an inner diameter is larger than the small-diameter hole portion, the sensor case has a columnar portion which is disposed along a central axis extending in the up and down direction and of which at least a portion is inserted into the small-diameter hole portion, and a flange portion which protrudes from the columnar portion to an outside in a radial direction and is inserted into the large-diameter hole portion, the flange portion is disposed to face a lower side of the upper body in the up and down direction, and the seal member has an annular shape surrounding the columnar portion on an upper side of the flange portion in the up and down direction, and seals a portion between an inner surface of the accommodation hole portion and the sensor case.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

In each drawing, the Z-axis direction is set to as an up and down direction Z. The positive side in the Z-axis direction is set to as an upper side in the up and down direction. The negative side in the Z-axis direction is set to as a lower side in the up and down direction. In the following description, the upper side in the up and down direction is simply referred to as "upper side", and the lower side in the up and down direction is simply referred to as "lower side". The up and down direction, the upper side, and the lower side are simply the names for explaining the relative positional relationship between the respective portions, and the actual disposition relationship or the like may be the disposition relation or the like other than the disposition relationship or the like indicated by these names.

Figure 1:
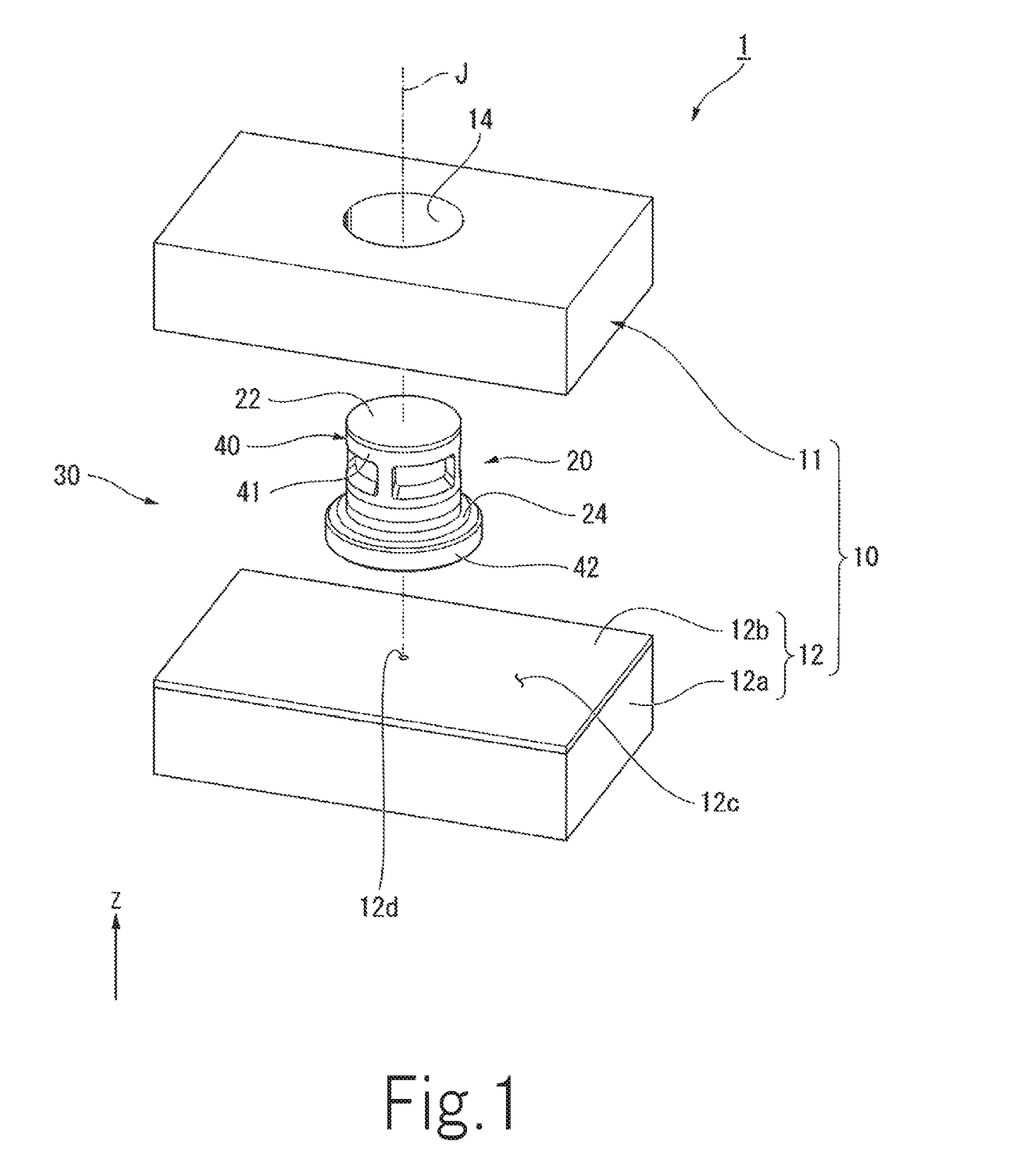
FIG. 1 is a perspective view showing an oil pressure sensor attachment structure of the present embodiment.
Figure 2:
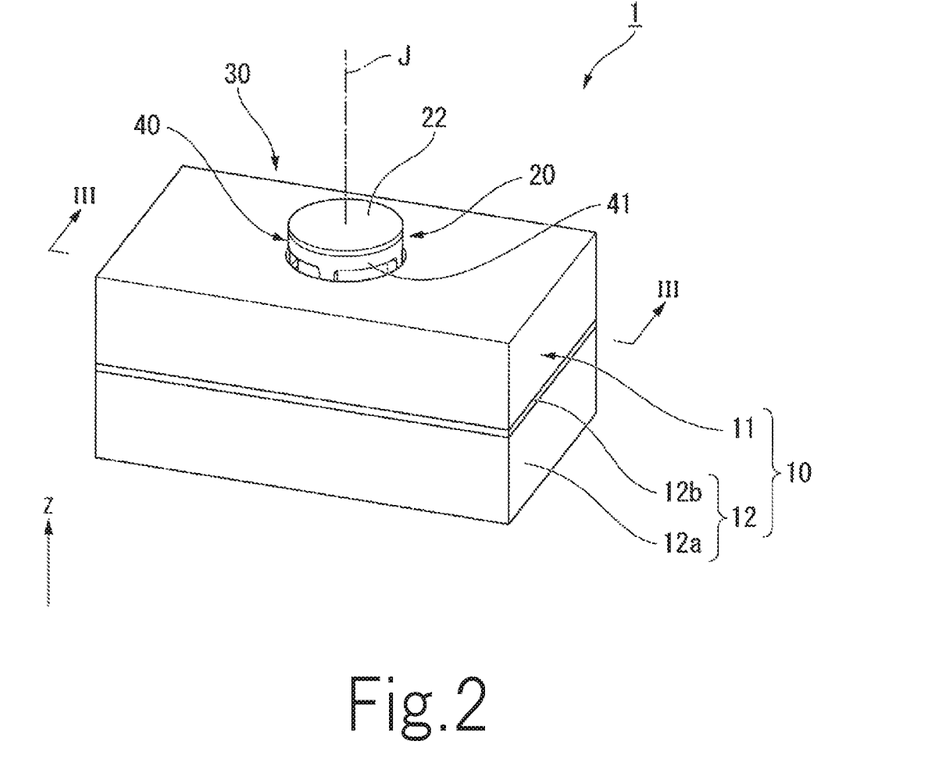
FIG. 2 is a perspective view showing an oil pressure sensor attachment structure of the present embodiment.
Figure 3:
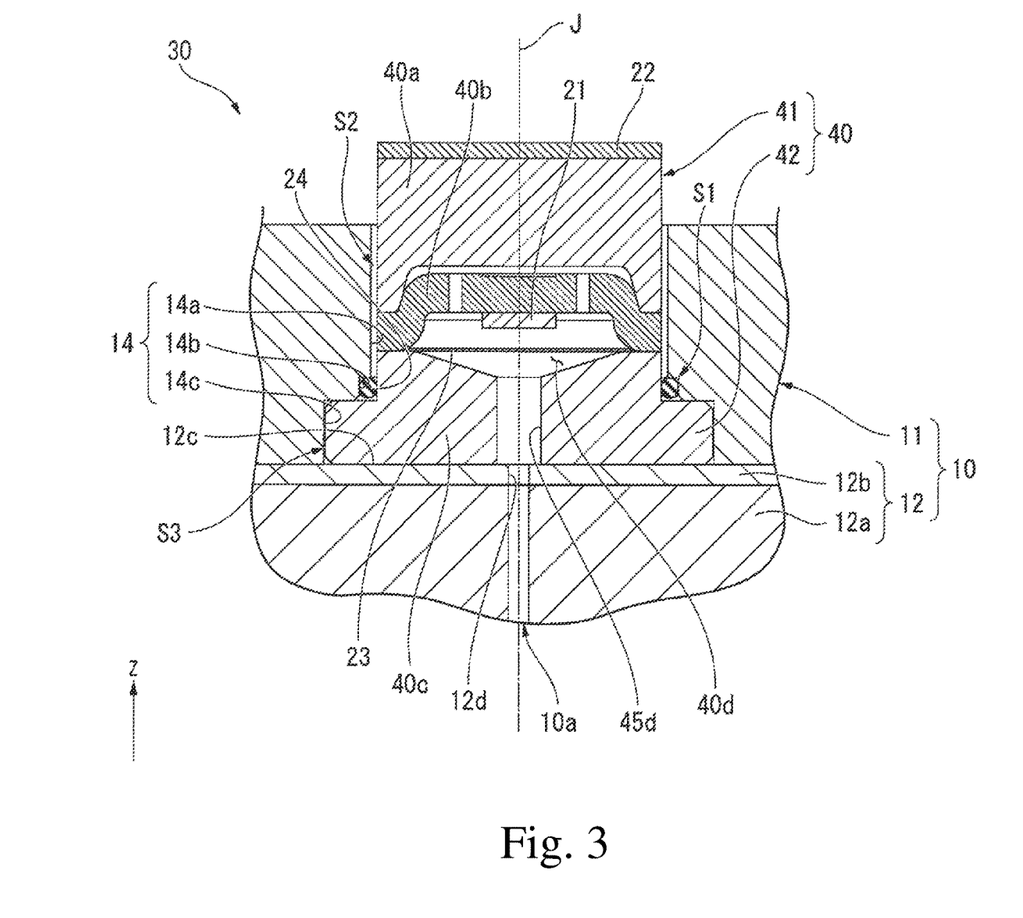
FIG. 3 is a view showing an oil pressure sensor attachment structure of the present embodiment and is a cross-sectional view taken along line III-III in FIG. 2.
Figure 4:
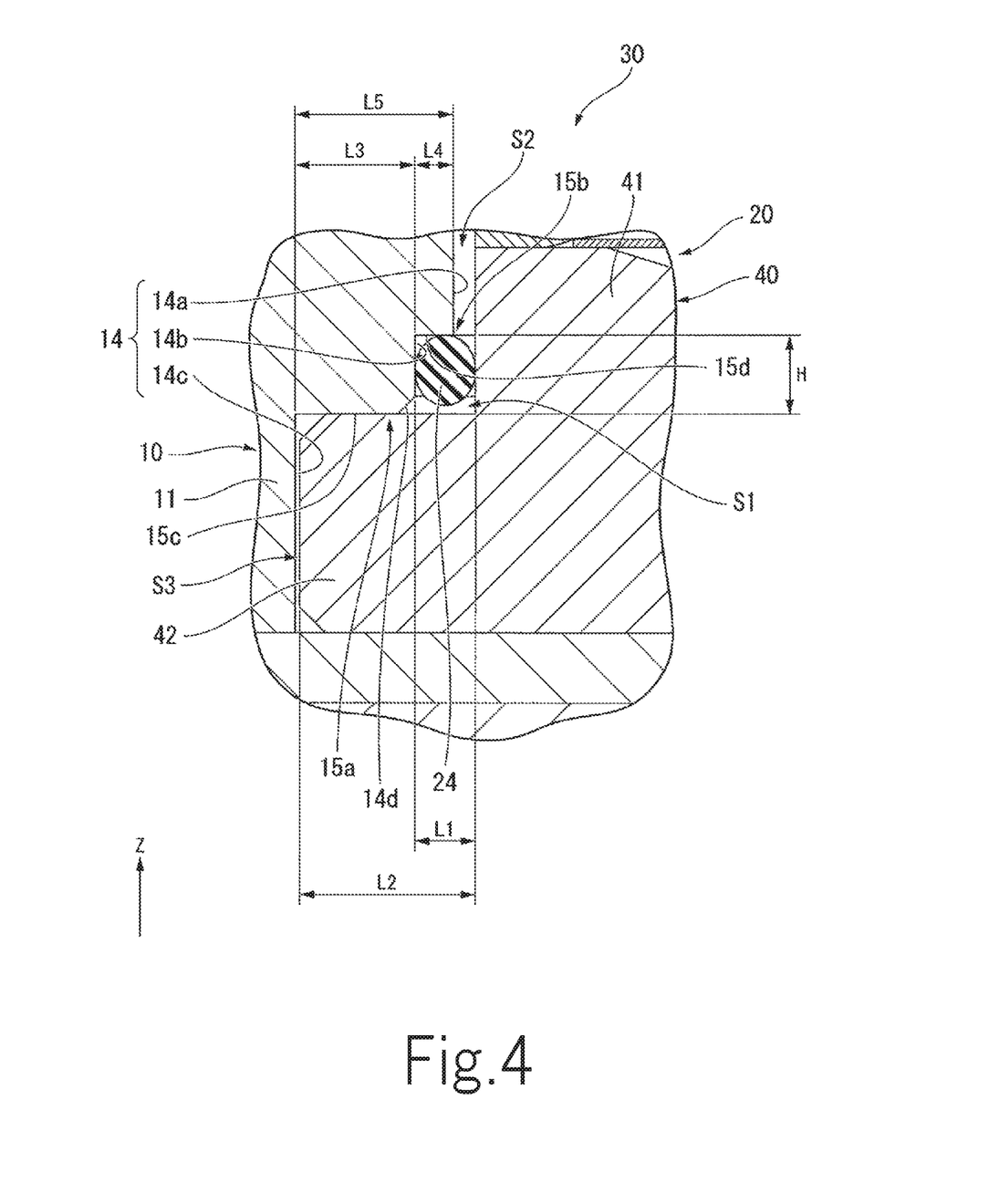
FIG. 4 is a cross-sectional view showing a portion of the oil pressure sensor attachment structure of the present embodiment.

In an oil pressure sensor attachment structure 30 of this embodiment shown in FIGS. 1 to 4, an oil pressure sensor 20 is attached to an oil path body 10 of a control valve in an oil pressure control device 1. FIG. 1 shows a state before the oil pressure sensor 20 is attached to the oil path body 10. FIGS. 2 to 4 show a state where the oil pressure sensor 20 is attached to the oil path body 10 by the oil pressure sensor attachment structure 30. A state where the oil pressure sensor 20 is attached to the oil path body 10 by the oil pressure sensor attachment structure 30 is referred to as "attached state". In the following description, in a case where there is no particular indication, the relative positional relationship between the portions is set to be the positional relationship in the attached state.

The oil pressure sensor attachment structure 30 includes the oil path body 10, a sensor case 40 of the oil pressure sensor 20, and a seal member 24. As shown in FIG. 3, the oil path body 10 has an oil path 10a through which the oil flows therein. The oil pressure sensor 20 measures the pressure of the oil flowing in the oil path 10a. The oil path body 10 has a lower body 12 and an upper body 11 which is disposed to overlap the upper side of the lower body 12.

The lower body 12 includes a lower body main body 12a and a separate plate 12b disposed to overlap the upper side of the lower body main body 12a. A portion of the oil path 10a is provided in the lower body main body 12a. The separate plate 12b has a plate shape orthogonal to the up and down direction Z. Although not shown, a portion of the oil path 10a is configured by closing an opening of a groove which is provided on the upper surface of the lower body main body 12a and extends in a direction orthogonal to the up and down direction Z by the separate plate 12b.

The lower body 12 has an oil path opening portion 12d connected to the oil path 10a on the upper surface 12c of the lower body 12. In the present embodiment, the upper surface 12c of the lower body 12 is the upper surface of the separate plate 12b. The oil path opening portion 12d passes through the separate plate 12b in the up and down direction Z. As shown in FIG. 1, in the present embodiment, the oil path opening portion 12d has a circular shape about a central axis J extending in the up and down direction Z. In the following description, the radial direction about the central axis J is simply referred to as "radial direction", and the circumferential direction about the central axis J is simply referred to as "circumferential direction".

The upper body 11 has an accommodation hole portion 14. In other words, the oil path body 10 has the accommodation hole portion 14. As shown in FIG. 3, in this embodiment, the accommodation hole portion 14 is a hole that is recessed upward from the lower surface of the upper body 11. The accommodation hole portion 14 passes through the upper body 11 in the up and down direction Z. An inner edge of the accommodation hole portion 14 has a circular shape about the central axis J when viewed along the up and down direction Z. The accommodation hole portion 14 accommodates the oil pressure sensor 20 in a state where at least a portion of the oil pressure sensor 20 is disposed between the upper body 11 and the lower body 12 in the up and down direction Z.

The accommodation hole portion 14 has a small-diameter hole portion 14a, a medium-diameter hole portion 14b, and a large-diameter hole portion 14c. The small-diameter hole portion 14a is opened on the upper surface of the upper body 11. The small-diameter hole portion 14a extends downward from the upper surface of the upper body 11. The medium-diameter hole portion 14b is connected to the lower end portion of the small-diameter hole portion 14a. The inner diameter of the medium-diameter hole portion 14b is larger than the inner diameter of the small-diameter hole portion 14a and smaller than the inner diameter of the large-diameter hole portion 14c. As shown in FIG. 4, the lower end portion of the medium-diameter hole portion 14b is an enlarged diameter portion 14d of which an inner diameter increases from the upper side to the lower side. The inner circumferential surface of the enlarged diameter portion 14d is a tapered surface whose internal diameter gradually increases from the upper side to the lower side.

The large-diameter hole portion 14c is connected to the lower end portion of the medium-diameter hole portion 14b. In other words, the medium-diameter hole portion 14b connects the small-diameter hole portion 14a and the large-diameter hole portion 14c to each other in the up and down direction Z between the small-diameter hole portion 14a and the large-diameter hole portion 14c. The large-diameter hole portion 14c is disposed below the small-diameter hole portion 14a and has an inner diameter larger than that of the small-diameter hole portion 14a. As shown in FIG. 3, the large-diameter hole portion 14c is opened to the lower surface of the upper body 11. The dimension of the large-diameter hole portion 14c in the up and down direction Z is larger than the dimension of the medium-diameter hole portion 14b in the up and down direction Z. The dimension of the small-diameter hole portion 14a in the up and down direction Z is larger than the dimension of the large-diameter hole portion 14c in the up and down direction Z.

As shown in FIG. 4, a first stepped portion 15a is provided between the medium-diameter hole portion 14b and the large-diameter hole portion 14c. The first stepped portion 15a is a step in which the inner diameter increases from the upper side to the lower side. The first stepped surface 15c facing downward in the first stepped portion 15a is an annular flat surface orthogonal to the up and down direction Z. A second stepped portion 15b is provided between the small-diameter hole portion 14a and the medium-diameter hole portion 14b. The second stepped portion 15b is a step in which the inner diameter increases from the upper side to the lower side. The second stepped surface 15d facing downward in the second stepped portion 15b is an annular flat surface orthogonal to the up and down direction Z. The distance L4 between the inner circumferential surface of the small-diameter hole portion 14a and the inner circumferential surface of the medium-diameter hole portion 14b in the radial direction is set to be smaller than the distance L3 between the inner circumferential surface of the medium-diameter hole portion 14b and the inner circumferential surface of the large-diameter hole portion 14c in the radial direction.

As shown in FIG. 3, the oil pressure sensor 20 has a sensor case 40, a sensor main body 21, and a diaphragm 23. The sensor case 40 covers the sensor main body 21. The sensor case 40 is installed on the upper surface 12c of the lower body 12. The sensor case 40 has a columnar portion 41 and a flange portion 42.

The columnar portion 41 is disposed along a central axis J extending in the up and down direction Z and a terminal portion is provided at an upper end thereof, and the electrical connection between the sensor main body 21 and the terminal portion 22 by the wiring disposed therein is made. As shown in FIG. 1, in this embodiment, the columnar portion 41 has a columnar shape. The columnar portion 41 is made of resin, for example. As shown in FIG. 3, at least a portion of the columnar portion 41 is inserted into the small-diameter hole portion 14a. In the present embodiment, the columnar portion 41 passes through the large-diameter hole portion 14c, the medium-diameter hole portion 14b, and the small-diameter hole portion 14a. The upper end portion of the columnar portion 41 protrudes upward from the upper surface of the upper body 11.

The outer diameter of the columnar portion 41 is smaller than the inner diameter of the small-diameter hole portion 14a and the inner diameter of the medium-diameter hole portion 14b. A first gap S1 is provided between the inner circumferential surface of the medium-diameter hole portion 14b and the outer circumferential surface of the columnar portion 41 in the radial direction. A second gap S2 is provided between the inner circumferential surface of the small-diameter hole portion 14a and the outer circumferential surface of the columnar portion 41 in the radial direction. On the lower surface of the columnar portion 41, a sensing hole 45 recessed upward from the lower surface of the columnar portion 41 and connected to an accommodation space 40d described below is provided. In other words, the sensor case 40 has a sensing hole 45 on the lower surface of the sensor case 40. The sensing hole 45 is connected to the oil path opening portion 12d in a state where the sensor case 40 is installed on the upper surface 12c of the lower body 12. The inner diameter of the sensing hole 45 is larger than the inner diameter of the oil path opening portion 12d.

The flange portion 42 protrudes radially outward from the columnar portion 41. In the present embodiment, the flange portion 42 is provided at the lower end portion of the columnar portion 41. As shown in FIG. 1, the flange portion 42 is an annular shape surrounding the columnar portion 41 in the circumferential direction. The flange portion 42 is made of metal, for example. As shown in FIG. 3, the flange portion 42 is inserted into the large-diameter hole portion 14c. The flange portion 42 is disposed to face the lower side of the upper body 11. More specifically, as shown in FIG. 4, the flange portion 42 faces the first stepped surface 15c in the up and down direction Z. The upper surface of the flange portion 42 comes into contact with the first stepped surface 15c.

The dimension of the flange portion 42 in the up and down direction Z is smaller than the dimension between the upper surface 12c of the lower body 12 and the first stepped surface 15c in the up and down direction Z, for example. The flange portion receives an upward force by the oil flowing into the accommodation hole portion 14 from the oil path opening portion 12d and is pressed from the lower side to the first stepped surface 15c. The outer diameter of the flange portion 42 is larger than the inner diameter of the small-diameter hole portion 14a and the inner diameter of the medium-diameter hole portion 14b and smaller than the inner diameter of the large-diameter hole portion 14c. The dimension L2 of the flange portion 42 in the radial direction is larger than the distance L5 between the inner circumferential surface of the small-diameter hole portion 14a and the inner circumferential surface of the large-diameter hole portion 14c in the radial direction. The dimension L2 of the flange portion 42 in the radial direction is a distance between the outer circumferential surface of the columnar portion 41 and the outer circumferential surface of the flange portion 42 in the radial direction. A third gap S3 is provided between the flange portion and the inner circumferential surface of the large-diameter hole portion 14c in the radial direction.

As shown in FIG. 3, in this embodiment, the sensor case 40 is configured with three members of an upper case 40a, a lid portion 40b, and a lower case 40c. The upper case 40a is a portion constituting the upper portion of the columnar portion 41. The upper case 40a is, for example, a single member made of resin. The lower case 40c is a portion constituting a lower portion of the columnar portion 41. The flange portion 42 is provided in the lower case 40c. The lower case 40c is, for example, a single metal member. The lid portion 40b is interposed in the up and down direction Z in a state of being in contact with the upper case 40a and the lower case 40c.

An accommodation space 40d is provided between the lower case 40c and the lid portion 40b in the up and down direction Z. The accommodation space 40d is partitioned in the up and down direction Z by the diaphragm 23. An upper end of the sensing hole 45 is opened in a lower portion of the accommodation space 40d. The sensor main body 21 is installed on the lower surface of the lid portion 40b in the upper portion of the accommodation space 40d. The upper portion of the accommodation space 40d is filled with a pressure transmitting liquid. In the attached state, oil flows into the lower portion of the accommodation space 40d via the sensing hole 45 connected to the oil path opening portion 12d. The pressure of the oil flowing into the lower portion of the accommodation space 40d is applied to the sensor main body 21 via the diaphragm 23 and the pressure transmitting liquid. Accordingly, the oil pressure of the oil in the oil path 10a can be measured by the sensor main body 21.

As shown in FIGS. 1 and 3, the seal member 24 has an annular shape surrounding the columnar portion 41 on the upper side of the flange portion 42. In the present embodiment, the seal member 24 is an O-ring. Therefore, the seal member 24 can be made inexpensive, and the manufacturing cost of the oil pressure control device 1 can be reduced. The seal member 24 seals a portion between the oil path body 10 and the sensor case 40. More specifically, the seal member 24 seals a portion between the inner surface of the accommodation hole portion 14 and the sensor case 40.

In this specification, "inner surface of accommodation hole portion" includes a surface exposed in the accommodation hole portion. For example, in the present embodiment, the inner surface of the accommodation hole portion 14 includes the inner circumferential surface of the small-diameter hole portion 14a, the inner circumferential surface of the medium-diameter hole portion 14b, the inner circumferential surface of the large-diameter hole portion 14c, the first stepped surface 15c, and a second stepped surface 15d.

As shown in FIG. 4, in the present embodiment, the seal member 24 is fitted into the medium-diameter hole portion 14b. The seal member 24 is disposed in the first gap S1 and is interposed in the radial direction in a state of being in contact with the inner circumferential surface of the medium-diameter hole portion 14b and the outer circumferential surface of the columnar portion 41. The dimension L1 of the first gap S1 in the radial direction is smaller than the dimension of the seal member 24 in the radial direction in a state where the seal member is not deformed. Therefore, the seal member 24 fitted in the medium-diameter hole portion 14b is compressed in the radial direction by the inner circumferential surface of the medium-diameter hole portion 14b and the outer circumferential surface of the columnar portion 41, and is elastically deformed. Accordingly, the seal member 24 comes into close contact with the inner circumferential surface of the medium-diameter hole portion 14b and the outer circumferential surface of the columnar portion 41, and the seal member 24 can seal between the oil path body 10 and the sensor case 40 more accurately.

In this specification, "a state where the seal member is not deformed" includes, for example, a state before the seal member is attached to the oil pressure sensor and a state where the seal member is attached to the oil pressure sensor and the oil pressure sensor is not inserted into the accommodation hole portion. In other words, the dimension of the seal member 24 in the radial direction in a state where the seal member is not deformed includes the dimension of the seal member 24 in the radial direction in a state where the seal member 24 is attached to the oil pressure sensor 20 while the seal member 24 surrounds the columnar portion 41 before the oil pressure sensor 20 is inserted into the accommodation hole portion 14, as shown in FIG. 1.

As shown in FIG. 4, the seal member 24 is disposed between the upper surface of the flange portion 42 and the second stepped surface 15d in the up and down direction Z. The dimension H between the first stepped surface 15c and the second stepped surface 15d in the up and down direction Z is larger than the dimension of the seal member 24 in the up and down direction Z. Therefore, a gap is provided at least one of a portion between the seal member 24 and the upper surface of the flange portion 42 in the up and down direction Z and a portion between the seal member 24 and the second stepped surface 15d in the up and down direction Z. Accordingly, even if the flange portion 42 is pressed upward against the first stepped surface 15c by the oil flowing into the accommodation hole portion 14, compression of the seal member 24 in the up and down direction Z can be suppressed by the upper surface of the flange portion 42 and the second stepped surface 15d. Therefore, excessive crushing of the seal member 24 in the up and down direction Z by the flange portion 42 can be suppressed, and damage to the seal member 24 can be suppressed. In FIG. 4, the seal member 24 comes into contact with the second stepped surface 15d, and a gap is provided between the seal member 24 and the upper surface of the flange portion 42.

In the present specification, "dimension of seal member in up and down direction Z" includes the dimension of the seal member in the up and down direction Z in a state where the seal member is not deformed and the dimension of the seal member in the up and down direction Z in a state where the seal member is accommodated in the accommodation hole portion and is compressed in the radial direction. When the seal member 24 is compressed in the radial direction and is elastically deformed by the inner circumferential surface of the medium-diameter hole portion 14b and the outer circumferential surface of the columnar portion 41, the dimension of the seal member 24 in the up and down direction Z becomes large, while the dimension of the seal member 24 in the radial direction becomes small. In the present embodiment, the dimension H of a portion between the first stepped surface 15c and the second stepped surface 15d in the up and down direction Z is larger than the dimension of the seal member 24 in the up and down direction Z which is compressed in the radial direction and becomes large in the up and down direction Z, as described above.

First, as shown in FIG. 1, an installer fits and mounts the seal member 24 into the columnar portion 41 of the oil pressure sensor 20. In this state, the seal member 24 comes in contact with, for example, the upper surface of the flange portion 42. Then, the installer inserts the oil pressure sensor 20 on which the seal member 24 is mounted into the accommodation hole portion 14. Specifically, as shown in FIG. 1, the installer inserts the upper portion of the columnar portion 41 from the lower side thereof into the accommodation hole portion 14. The upper portion of the columnar portion 41, that is, the upper portion of the sensor case 40 is inserted into the small-diameter hole portion 14a via the large-diameter hole portion 14c and the medium-diameter hole portion 14b. The installer pushes the oil pressure sensor 20 from the lower side into the accommodation hole portion 14 until the flange portion 42 is inserted into the large-diameter hole portion 14c and the upper surface of the flange portion 42 comes into contact with the first stepped surface 15c.

When the oil pressure sensor 20 is pushed into the accommodation hole portion 14, the seal member 24 mounted on the columnar portion 41 is inserted into the medium-diameter hole portion 14b and fitted therein. At this time, since the lower end portion of the medium-diameter hole portion 14b is the enlarged diameter portion 14d, the seal member 24 is likely to be guided into the medium-diameter hole portion 14b along the inner circumferential surface of the enlarged diameter portion 14d. Accordingly, when the oil pressure sensor 20 is inserted into the accommodation hole portion 14, the seal member 24 is likely to be fitted into the medium-diameter hole portion 14b.

Next, as shown in FIGS. 2 and 3, the installer fixes the upper body 11 and the lower body 12 in a state where the upper surface 12c of the lower body 12 comes into contact with the lower surface of the upper body 11. Accordingly, the lower opening of the accommodation hole portion 14 is closed by the lower body 12, and the oil pressure sensor 20 is supported from the lower side by the upper surface 12c of the lower body 12. As described above, the oil pressure sensor 20 is attached to the oil path body 10 by the oil pressure sensor attachment structure 30.

According to the present embodiment, since the seal member 24 surrounds the columnar portion 41 on the upper side of the flange portion 42, the flange portion 42 suppresses the downward movement of the seal member 24. Accordingly, even if the upper body 11 is not turned upside down in a state before the upper body 11 and the lower body 12 are fixed, after the oil pressure sensor 20 is inserted into the accommodation hole portion 14 of the upper body 11, falling off of the seal member 24 from the oil pressure sensor 20 can be suppressed. Therefore, the time and the labor of attaching the oil pressure sensor 20 can be reduced. Therefore, according to the present embodiment, the oil pressure sensor attachment structure 30 is obtained which can suppress the falling off of the seal member 24 at the labor of attaching the oil pressure sensor 20 and can improve the assembling performance of the oil pressure control device 1.

In addition, when the oil pressure sensor 20 is inserted into the accommodation hole portion 14, the seal member 24 seals a portion between the inner surface of the accommodation hole portion 14 and the sensor case 40. Therefore, a frictional force is generated between the inner surface of the accommodation hole portion 14 and the seal member 24 and between the sensor case 40 and the seal member 24, and the oil pressure sensor 20 is likely to be held in the accommodation hole portion 14. Accordingly, even if the upper body 11 is not turned upside down in a state before fixing the upper body 11 and the lower body 12, falling off of the oil pressure sensor 20 from the accommodation hole portion can be suppressed. Therefore, the time and the labor of attaching the oil pressure sensor 20 can be further reduced and the assembling performance of the oil pressure control device 1 can be further improved.

In the present embodiment, since the medium-diameter hole portion 14b into which the seal member 24 is fitted is provided, as described above, while excessive crushing of the seal member 24 in the up and down direction Z is suppressed, the seal member 24 is likely to be compressed and elastically deformed in the radial direction. The elastic force of the seal member 24 is applied to the inner circumferential surface of the medium-diameter hole portion 14b and the outer circumferential surface of the columnar portion 41, and the frictional force between the inner circumferential surface of the medium-diameter hole portion 14b and the seal member 24 and the frictional force between the outer circumferential surface of the columnar portion 41 and the seal member 24 increases by the seal member 24 being compressed and elastically deformed in the radial direction. Therefore, the oil pressure sensor 20 is likely to be held in the accommodation hole portion 14, and falling off of oil pressure sensor 20 is further suppressed in a state before fixing the upper body 11 and the lower body 12.

In addition, according to the present embodiment, since the accommodation hole portion 14 is a hole recessed upward from the lower surface of the upper body 11, the oil pressure sensor attachment structure 30 can be provided without changing the configuration of the lower body 12. In addition, as in this embodiment, the separate plate 12b is likely to be provided. By making the separate plate 12b into a plate shape having a relatively high surface accuracy, the upper surface of the separate plate 12b and the lower surface of the upper body 11 come into contact with each other so that the portion between the upper surface of the separate plate 12b and the lower surface of the upper body 11 can be sealed. Accordingly, leakage of the oil flowing into the accommodation hole portion 14 from the oil path opening portion 12d from a portion between the upper surface of the separate plate 12b and the lower surface of the upper body 11 to the outside in the radial direction can be suppressed.

In addition, according to the present embodiment, the outer diameter of the flange portion 42 is larger than the inner diameter of the small-diameter hole portion 14a and smaller than the inner diameter of the large-diameter hole portion 14c. Therefore, the flange portion 42 can be easily inserted into the large-diameter hole portion 14c while preventing the flange portion 42 from coming out upward from the large-diameter hole portion 14c.

When the oil pressure sensor 20 is inserted into the accommodation hole portion 14, there is a case where the seal member 24 fitted in the medium-diameter hole portion 14b remains in a state of being in contact with the upper surface of the flange portion 42. However, in an attached state, oil flows into the medium-diameter hole portion 14b from the lower side through the gap between the flange portion 42 and the large-diameter hole portion 14c. Therefore, the seal member 24 is pushed up by oil pressure of the oil and pressed against the second stepped surface 15d. Accordingly, a force is applied to the seal member 24 in a direction expanding in the radial direction. Therefore, the seal member 24 can be more pressed against the inner circumferential surface of the medium-diameter hole portion 14b and the outer circumferential surface of the columnar portion 41, and adherence between the seal member 24, the inner circumferential surface of the medium-diameter hole portion 14b, and the outer circumference of the columnar portion 41 can be improved. Therefore, the seal member 24 can seal between the oil path body 10 and the sensor case 40 more accurately.

The present invention is not limited to the embodiment described above, and other configurations can be adopted. In the following explanation, the same reference numerals are attached to the same configurations as those in the embodiment described above, and the explanation may be omitted in some cases.

The oil path opening portion 12d may not be positioned at a position where the central axis J passes if the oil path opening portion is connected to the sensing hole 45 in the attached state. In other words, in the embodiment described above, the positions of the oil path opening portion 12d and the sensing hole 45 may be deviated from the central axis J. In addition, the sensor case 40 may be a single member. The separate plate 12b may not be provided. In addition, the flange portion 42 may not be also annular as long as the flange portion protrudes radially outward from the columnar portion 41. The flange portion 42 may not be provided in a portion thereof in the circumferential direction. In addition, a plurality of flange portions 42 may be provided discretely along the circumferential direction.

The accommodation hole portion 14 may be provided to extend over the upper body 11 and the lower body 12. In this case, for example, a recessed portion which is recessed downward may be provided on the upper surface 12c of the lower body 12, and the flange portion 42 may be inserted into the recessed portion. In addition, the accommodation hole portion 14 may not be opened to the upper side thereof. In other words, the accommodation hole portion 14 may be a bottomed hole recessed upward from the lower surface of the upper body 11.

In addition, the dimension H in the up and down direction Z between the first stepped surface 15c and the second stepped surface 15d may be larger than the dimension of the seal member 24 in a state of not being deformed state in the up and down direction Z and may be equal to or less than the dimension of the seal member 24 in the up and down direction Z which is elastically deformed in the radial direction. In addition, the dimension H between the first stepped surface 15c and the second stepped surface 15d in the up and down direction Z may be equal to or smaller than the dimension of the seal member 24 in a state of not being deformed in the up and down direction Z. In this case, the dimension L1 of the first gap S1 in the radial direction may be equal to or larger than the dimension of the seal member 24 in the radial direction in a state where the seal member is not deformed, or may be larger than a dimension of the seal member 24 in the radial direction which is compressed in the up and down direction Z by the first stepped surface 15c and the second stepped surface 15d and become large in the radial direction. In addition, at least one of the first stepped surface 15c and the second stepped surface 15d may be an inclined surface inclined with respect to the up and down direction Z.

Figure 5:
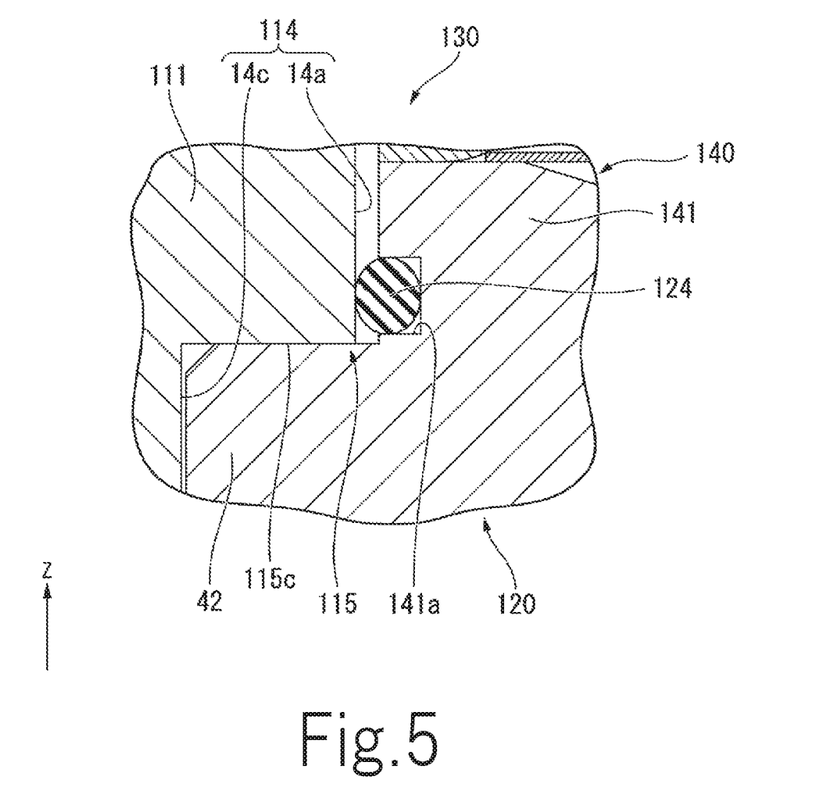
FIG. 5 is a cross-sectional view showing a portion of an oil pressure sensor attachment structure which is another example of the present embodiment.

In addition, the oil pressure sensor attachment structure may have a configuration such as an oil pressure sensor attachment structure 130 shown in FIG. 5. As shown in FIG. 5, in the upper body 111 of the oil pressure sensor attachment structure 130, the accommodation hole portion 114 does not have the medium-diameter hole portion 14b. The accommodation hole portion 114 is configured by connecting the large-diameter hole portion 14c to the lower end portion of the small-diameter hole portion 14a. Accordingly, a stepped portion 115 having an increased inner diameter from the upper side to the lower side thereof is provided between the small-diameter hole portion 14a and the large-diameter hole portion 14c. The upper surface of the flange portion 42 comes into contact with the downward stepped surface 115c of the stepped portion 115. The stepped surface 115c is a flat surface orthogonal to the up and down direction Z. The stepped surface 115c may be an inclined surface inclined with respect to the up and down direction Z.

In the oil pressure sensor 120, the columnar portion 141 of the sensor case 140 has a groove portion 141a into which the seal member 124 is fitted on the radially outer side surface. Therefore, detachment of the seal member 124 from the columnar portion 141 can be suppressed. Although not shown, the groove portion 141a has an annular shape provided on the radially outer side surface of the columnar portion 141 over one circumference in the circumferential direction. The seal member 124 fitted into the groove portion 141a is interposed in a state of being in contact with the portion between the inner circumferential surface of the small-diameter hole portion 14a and the bottom surface of the groove portion 141 a so as to be compressed and elastically deformed in the radial direction. Accordingly, the seal member 124 seals a portion between the inner circumferential surface of the small-diameter hole portion 14a and the outer circumferential surface of the columnar portion 141.

The groove portion into which the seal member is fitted may be provided on the upper surface of the flange portion. In this case, for example, the seal member is interposed in the up and down direction Z in a state of being in contact with the stepped surface and the bottom surface of the groove portion.

Figure 6:
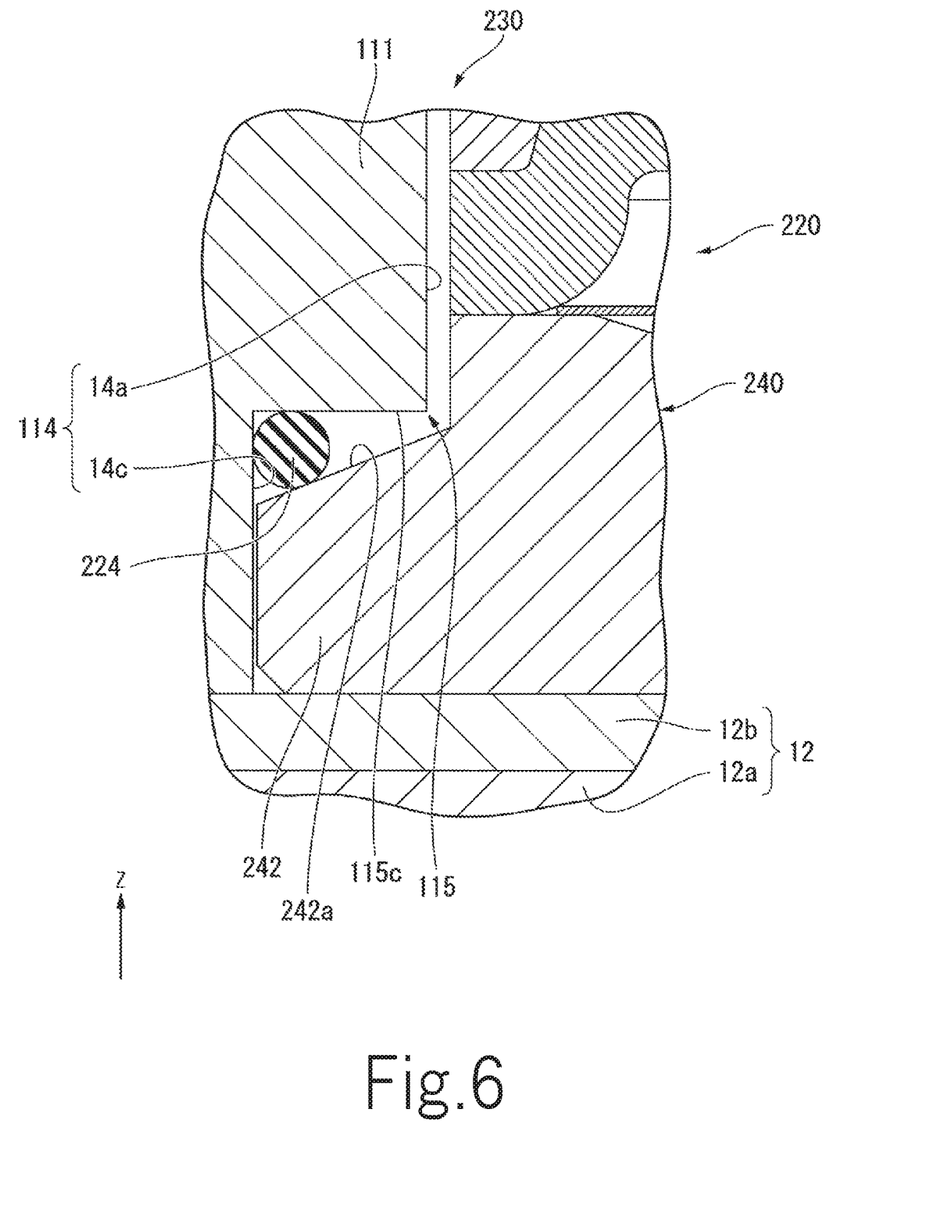
FIG. 6 is a cross-sectional view showing a portion of the oil pressure sensor attachment structure which is still another example of the present embodiment.

In addition, the oil pressure sensor attachment structure may have a configuration such as an oil pressure sensor attachment structure 230 shown in FIG. 6. As shown in FIG. 6, in the oil pressure sensor 220 of the oil pressure sensor attachment structure 230, the upper surface of the flange portion 242 of the sensor case 240 is the inclined surface 242a. The inclined surface 242a is an inclined surface gradually positioned on the lower side from the radially inner side to the radially outer side. The inclined surface 242a is an annular tapered surface.

The seal member 224 is interposed in the up and down direction Z in a state of being in contact with the inclined surface 242a and the stepped surface 115c. Accordingly, the seal member 224 is compressed and elastically deformed in the up and down direction Z. In addition, the seal member 224 receives a force radially outward from the inclined surface 242a. Accordingly, the seal member 224 is pressed against the inner circumferential surface of the large-diameter hole portion 14c from the radially inner side, and is compressed and elastically deformed in the radial direction.

In addition, the oil path body to which the oil pressure sensor can be attached by the oil pressure sensor attachment structure of the embodiments described above is not particularly limited as long as the oil path body has an oil path through which the oil flows therein. For example, the oil pressure sensor attachment structure of the embodiment described above may be applied to an attachment structure of an oil pressure sensor with respect to an electric oil pump.

Each of the configurations described above can be appropriately combined within a range not inconsistent with each other.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An oil pressure sensor attachment structure in which an oil pressure sensor for measuring a pressure of an oil flowing in an oil path through which the oil flows is attached to an oil path body having the oil path therein,
    wherein the oil path body has a lower body, and an upper body which is disposed to overlap the lower body in an up and down direction,
    wherein the lower body has an oil path opening portion which is connected to the oil path on an upper surface of the lower body,
    wherein the oil pressure sensor has a sensor main body, and a sensor case which covers the sensor main body, and
    wherein the sensor case is installed on the upper surface of the lower body and has a sensing hole on the lower surface of the sensor case, which is connected to the oil path opening portion in a state where the sensor case is installed on the upper surface of the lower body,
    wherein the oil pressure sensor attachment structure comprises:
    the oil path body;
    the sensor case; and
    a seal member which seals a portion between the oil path body and the sensor case,
    wherein the oil path body has an accommodation hole portion which accommodates the oil pressure sensor in a state where at least a portion of the oil pressure sensor is disposed between the upper body and the lower body in the up and down direction,
    wherein the accommodation hole portion has
        a small-diameter hole portion, and
        a large-diameter hole portion which is disposed on the lower side of the small-diameter hole portion in the up and down direction and of which an inner diameter is larger than the small-diameter hole portion,
    wherein the sensor case has
        a columnar portion which is disposed along a central axis extending in the up and down direction and of which at least a portion is inserted into the small-diameter hole portion, and
        a flange portion which protrudes from the columnar portion to an outside in a radial direction and is inserted into the large-diameter hole portion,
    wherein the flange portion is disposed to face a lower side of the upper body in the up and down direction, and
    wherein the seal member has an annular shape surrounding the columnar portion on an upper side of the flange portion in the up and down direction, and seals a portion between an inner surface of the accommodation hole portion and the sensor case.

2. The oil pressure sensor attachment structure according to claim 1,
    wherein the outer diameter of the columnar portion is smaller than the inner diameter of the small-diameter hole portion, and
    wherein the outer diameter of the flange portion is larger than the inner diameter of the small-diameter hole portion and is smaller than the inner diameter of the large-diameter hole portion.

3. The oil pressure sensor attachment structure according to claim 1,
    wherein the accommodation hole portion has a medium-diameter hole portion which connects the small-diameter hole portion and the large-diameter hole portion to each other between the small-diameter hole portion and the large-diameter hole portion in the up and down direction, wherein the inner diameter of the medium-diameter hole portion is larger than the inner diameter of the small-diameter hole portion and is smaller than the inner diameter of the large-diameter hole portion, and wherein the seal member is fitted into the medium-diameter hole portion.

4. The oil pressure sensor attachment structure according to claim 3, wherein the columnar portion passes through the medium-diameter hole portion, wherein a first gap is provided between an inner circumferential surface of the medium-diameter hole portion and an outer circumferential surface of the columnar portion in the radial direction, and wherein a dimension of the first gap in the radial direction is smaller than a dimension of the seal member in a state of not being deformed in the radial direction.

5. The oil pressure sensor attachment structure according to claim 3, wherein the flange portion faces, a first stepped surface facing downward in the up and down direction, in the up and down direction in a first stepped portion between the medium-diameter hole portion and the large-diameter hole portion, and wherein a dimension, between the first stepped surface and a second stepped surface facing downward in the up and down direction, in the up and down direction in a second stepped portion between the small-diameter hole portion and the medium-diameter hole portion is larger than a dimension of the seal member in the up and down direction.

6. The oil pressure sensor attachment structure according to claim 3, wherein an end portion of a lower side of the medium-diameter hole portion in the up and down direction is an enlarged diameter portion of which an inner diameter becomes large from an upper side in the up and down direction to a lower side in the up and down direction.

7. The oil pressure sensor attachment structure according to claim 3, wherein the accommodation hole portion is a hole which is recessed from a lower surface of the upper body to an upper side in the up and down direction.

8. The oil pressure sensor attachment structure according to claim 7, wherein the columnar portion has a groove portion into which the seal member is fitted, on an outside in a radial direction.

9. The oil pressure sensor attachment structure according to claim 8, wherein the seal member is an O-ring.

* * * * *